May 4, 1943.  J. A. FRIED  2,318,384
TOOLMAKER'S COMPASS
Filed March 25, 1941

INVENTOR.
Jerome A. Fried
BY Robert V. Morse
ATTORNEY.

Patented May 4, 1943

2,318,384

UNITED STATES PATENT OFFICE 2,318,384

TOOLMAKER'S COMPASS

Jerome A. Fried, Ithaca, N. Y.

Application March 25, 1941, Serial No. 385,108

7 Claims. (Cl. 33—155)

This invention relates to compasses such as used by engravers, toolmakers and other skilled workmen in laying out precise work. Difficulty has been experienced in the past in scribing accurate circles—particularly small circles—due to the springing of the compass point as it is dragged around, and it is also sometimes difficult to accurately set the distances when the compass is on the work. The principal objects of the present invention are to provide the rigidity necessary for accurate work and to permit the compass to be easily manipulated with one hand. Other objects are to provide yielding vertical travel between the pivot and scribing points when in action; to provide supplementary adjustments to adapt it to different ranges of action; and to arrange and combine the parts so that they may be readily manufactured and assembled or disassembled for inspection, adjustment or repair. Further objects will become apparent as the description proceeds.

Referring now to the drawing illustrating a typical embodiment of the invention, Fig. 1 is an elevation view of an assembled compass with a side view of the gear head.

Similar reference numerals refer to similar parts thruout the various views.

Figure 1:
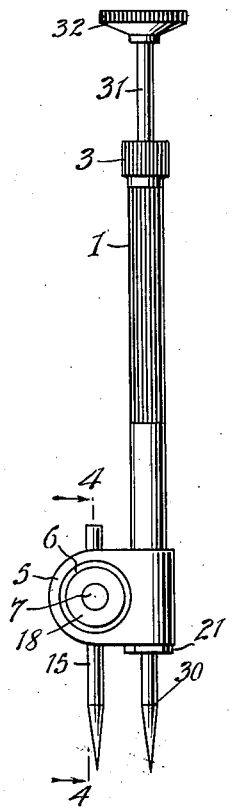
Figure 2:
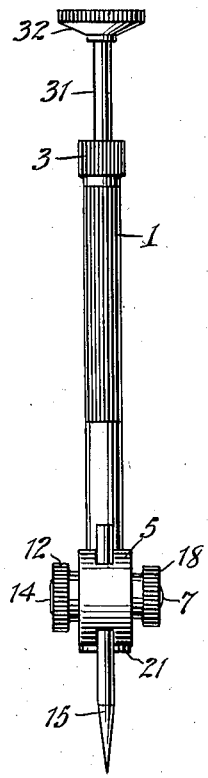
Fig. 2 is an elevation at right angles to Fig. 1, with an end view of the gear head.
Figure 3:
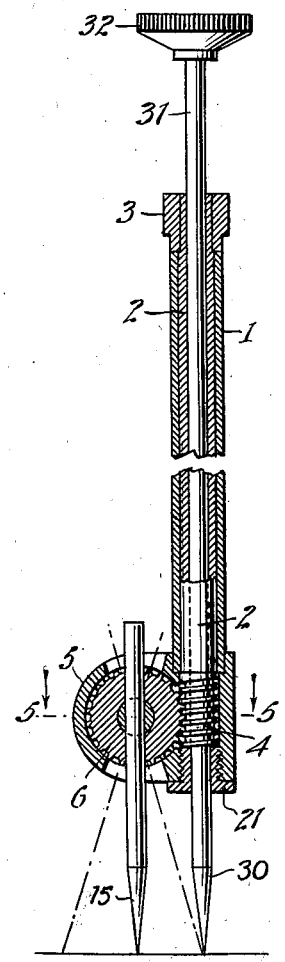
Fig. 3 is a view similar to Fig. 1 but on a somewhat larger scale and with the principal operating parts shown in cross-section.
Figure 4:
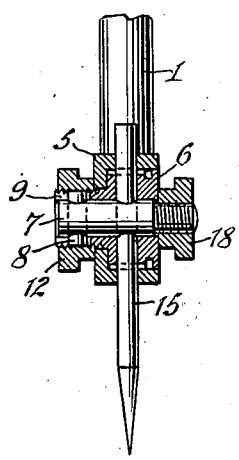
Fig. 4 is a detail cross-section on the line 4—4 of Fig. 1.
Figure 6:
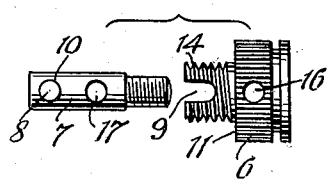
Fig. 6 shows the disassembled details of the needle clamping shaft and the worm wheel which fits upon it, as shown assembled in Fig. 4 and Fig. 5.
Figure 5:
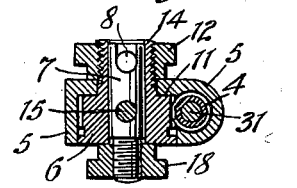
Fig. 5 is a detail cross-section on the line 5—5 of Fig. 3.

Referring now to Fig. 1, Fig. 2 and Fig. 3, the compass has a knurled body or staff 1 by which it is normally grasped, this body or staff 1 being hollow or tubular. Within the staff 1 extends a hollow worm shaft 2 having a knurled head 3 at one end by which it can be rotated and a worm 4 at the other end. Rigidly attached to the staff 1 is a housing or gear head 5 containing a worm wheel 6 meshing with the worm 4. The worm wheel 6 is mounted on the needle clamping shaft 7, these two parts being shown disassembled in Fig. 6 and assembled in Fig. 3, Fig. 4 and Fig. 5.

When assembled the worm wheel 6 is locked on the needle clamping shaft 7 so far as relative rotation is concerned by the pin 8 which passes thru the slot 9 in the hub of the worm wheel 6 and also passes thru the hole 10 in the shaft 7. The shoulder 11 of the worm wheel 6 is drawn up against the inner face of the housing 5 by means of the locknut 12 which is screwed on the threaded hub 14 of the worm wheel 6, passing over the ends of the short pin 8. The worm wheel 6 is then definitely held in the housing 5, so far as axial displacement is concerned, but the wheel 6 and its shaft 7 can be turned by the worm 4 which meshes with the worm wheel 6.

The scribing needle 15 passes thru the hole 16 in the worm wheel 6 and the corresponding hole 17 in the shaft 7, and the needle 15 is then held in place by the needle clamping nut 18, which when tightened, draws the shaft 7 one way and forces the worm wheel 6 the other way, so as to clamp the needle 15 between them. A slot 9 in the hub 14 of the worm wheel 6 permits this slight axial displacement, as the pin 8 can slide in this slot 9.

The worm shaft 2 is inserted from the lower end of the body or staff 1 so that the slight shoulder of the worm bears against the body 1 and limits its further insertion. A threaded plug 21 is then inserted to bear against the other thrust shoulder of the worm 4 thus holding it in proper position. The knurled head 3 is a tight press fit on the top of the worm shaft 2, for turning it.

The center pin or pivot needle 30 of the compass has a long shaft 31 extending up thru the hollow worm shaft 2 and terminating in a head 32, on which the index finger is generally rested when the compass is in use. This pivot needle 30 is free to slide up and down thru the worm shaft 2 and body of the compass 1 so that the relative projection of the needles 30 and 15 is controllable by merely moving the index finger relative to the other fingers of the hand holding the instrument. This prevents the scribing needle 15 from forcing the pivot needle 30 up off the work when some slight angularity is present during the rotation; and also permits the pressure on each needle to be easily controlled, as well as the total pressure on both needles.

When it is desired to use the instrument as an ordinary compass, a lead, or pen, or any other ordinary marking device may be inserted for the scribing point, the term "drawing point" covering all such equivalents.

When small circles are to be drawn, a short scribing needle 15 may be used if desired for extreme rigidity—that is, the needle may be clamped with only a short portion projecting. On the other hand, if unusually large circles are desired, the clamping nut 18 may be loosened and the scribing needle 15 may be pushed out to a greater length and then reclamped. This gives a larger possible radius. The freely movable center pivot 30 naturally adjusts itself to any length scribing needle. In general the approximate extension of the needles shown in the drawing gives a satisfactory range of action for both small and larger circles. The radius is of course adjusted by turning the worm shaft head 3 as previously described, and then can be rigidly locked at the desired radius by the locknut 12, thus precluding any possible inaccuracies due to lost motion in the parts.

The compass is readily assembled or disassembled in manufacture or servicing. Unscrewing the clamping nut 18 loosens the needle 15, which when removed permits the worm wheel 6 to be removed in one direction and the shaft 7 to be removed in the other direction. The worm 4 can be removed by unscrewing the threaded plug 21 and removing the knurled head 3, which is a tight press fit on the other end of the worm shaft 2.

The compass is easily handled and operated by one hand or two as desired, and the hand does not interfere with seeing the setting of the points, as the operating control is at the other end of the device. The fact that the scribing needle is supported close to the work, and that all the parts can be tightly clamped by the locknut 12 in the position set, gives the compass a high degree of rigidity, adapting it to the requirements of skilled toolmakers and others accustomed to precise work.

While I have in the foregoing described a particular embodiment of the invention, it will be understood that it is merely for purposes of illustration to make clear the principles thereof, and that the invention is not limited thereto, but is subject to various modifications and adaptations in form and structure as will be apparent to those skilled in the art without departing from the scope of the invention as stated in the following claims.

I claim:

1. In a compass, the combination of a hollow staff, a rotatable worm shaft within said staff, said worm shaft having a head above said staff by which it can be turned, a worm on the lower end of said worm shaft, an axially slidable needle shaft extending thru inside the staff, worm and worm shaft, said needle shaft having a head forming a finger rest, a worm wheel mounted on the lower portion of said staff and meshing with said worm, and a drawing point attached to said worm wheel, whereby the partial rotation of said worm wheel will swing the drawing point to set various amounts of compass radius.

2. In a compass, the combination of a hollow staff, a rotatable worm shaft within said staff, said worm shaft having a head above said staff by which it can be turned, a worm on the lower end of said worm shaft, an axially slidable needle shaft extending thru inside the staff, worm and worm shaft, said needle shaft having a head forming a finger rest, a worm wheel mounted on the lower portion of said staff and meshing with said worm, a worm wheel shaft, a pin passing thru the worm wheel and worm wheel shaft, said pin having a drawing point, whereby the partial rotation of said worm wheel will swing the drawing point to set various amounts of compass radius.

3. In a compass, the combination of a hollow staff, a rotatable worm shaft within said staff, said worm shaft having a head above said staff by which it can be turned, a worm on the lower end of said worm shaft, an axially slidable needle shaft extending thru inside the staff, worm and worm shaft, said needle shaft having a head forming a finger rest, a worm wheel mounted on the lower portion of said staff and meshing with said worm, a worm wheel shaft, a pin passing thru the worm wheel and worm wheel shaft, a clamping nut for clamping the worm wheel and worm wheel shaft to the pin, said pin having a drawing point, whereby the partial rotation of said worm wheel will swing the drawing point to set various amounts of compass radius.

4. In a compass, the combination of a staff having an axially movable central pivot point, a housing rigidly mounted on the lower portion of the staff, a shaft within said housing, a drawing point secured to said shaft, and remote control means operable from the upper end of the staff for partially rotating the shaft and thereby moving the drawing point at the lower portion of the staff to various distances from the central pivot point, whereby the compass may be set for various radii.

5. In a compass, the combination of a staff, an axially movable central pivot point extending thru the staff and terminating in a finger rest at the upper end, a housing rigidly mounted on the lower portion of the staff, a gear drive extending from the top of the staff to the housing, a cross shaft in said housing at right angles to the staff but spaced laterally therefrom, said shaft being operated by said gear drive to rotate thru a partial rotation, a drawing point mounted on said shaft for partial rotation about the axis thereof, whereby the compass may be set for various radii.

6. In a compass, the combination of a staff, an axially movable central pivot point extending thru the staff and terminating in a finger rest at the upper end, a housing rigidly mounted on the lower portion of the staff, a gear drive extending from the top of the staff to the housing, a cross shaft in said housing at right angles to the staff but spaced laterally therefrom, said shaft being operated by said gear drive to rotate thru a partial rotation, a drawing point mounted on said shaft for partial rotation about the axis thereof, whereby the compass may be set for various radii, and clamping means whereby the drawing point may be adjusted to various lengths.

7. In a compass, the combination of a staff having an axially movable central pivot point, a housing rigidly mounted on the lower portion of the staff, a shaft within said housing, a drawing point secured to said shaft, remote control means operable from the upper end of the staff for partially rotating the shaft and thereby moving the drawing point at the lower portion of the staff to various distances from the central pivot point, whereby the compass may be set for various radii, and means for rigidly locking the drawing point at the radius set.

JEROME A. FRIED.